(12) United States Patent
Ohyama et al.

(10) Patent No.: US 6,355,090 B1
(45) Date of Patent: Mar. 12, 2002

(54) METHOD OF MANUFACTURING ALUMINUM ALLOY FOR FLATTENING MATERIAL AND ALUMINUM ALLOY FLATTENING MATERIAL FOR AUTOMOBILES

(75) Inventors: Koji Ohyama; Yoichiro Bekki, both of Tokyo; Noboru Hayashi, Wako, all of (JP)

(73) Assignees: The Furukawa Electric Co., Ltd.; Honda Giken Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/445,391

(22) PCT Filed: Apr. 6, 1999

(86) PCT No.: PCT/JP99/01823

§ 371 Date: Dec. 7, 1999

§ 102(e) Date: Dec. 7, 1999

(87) PCT Pub. No.: WO99/53110

PCT Pub. Date: Oct. 21, 1999

(30) Foreign Application Priority Data

Apr. 8, 1998 (JP) .......................................... 10-112727
Apr. 8, 1998 (JP) .......................................... 10-112728

(51) Int. Cl.$^7$ ........................... C22B 21/00; C22C 21/06
(52) U.S. Cl. ........................ 75/687; 148/688; 420/532; 420/536; 420/537; 420/538; 420/590
(58) Field of Search ........................... 75/687; 420/590, 420/532, 537, 438, 536; 148/688

(56) References Cited

U.S. PATENT DOCUMENTS

| 4,711,762 A | * | 12/1987 | Vernam et al. ............. 420/532 |
| 5,993,572 A | * | 11/1999 | Saito et al. ................. 148/440 |
| 6,123,899 A | * | 9/2000 | Setzer et al. ................ 420/590 |

FOREIGN PATENT DOCUMENTS

| JP | A754061 | 2/1995 |
| JP | A7207350 | 8/1995 |
| JP | A8225874 | 9/1996 |

OTHER PUBLICATIONS

The Aluminum Association, Inc., "Registration Record of Aluminum Association Alloy Designations and Chemical Composition Limits for Aluminum Alloys in the Form of Castings and Ingot", 1989, pp. 5 and 8.*

The Aluminum Association, Inc., "Registration Record of International Alloy Designations and Chemical Composition Limits for Wrought Aluminum and Wrought Aluminum Alloys", 1994, pp. 4, 5, 7, and 8.*

* cited by examiner

*Primary Examiner*—Roy King
*Assistant Examiner*—Tima McGuthry-Banks

(57) ABSTRACT

There is disclosed a method of producing an aluminum alloy for automotive parts, comprising adding a scrap of an aluminum wrought alloy or a pure aluminum ingot to an aluminum alloy casting scrap, melting the mixture to dilute impurities, and if necessary, adjusting elements of the resultant. According to the above method, aluminum alloy casting scraps, which contain large amounts of impurities and have been difficult to recycle into other articles until now, can be converted to an aluminum alloy material that is applicable as a wrought material usable as a higher-grade material.

9 Claims, No Drawings

METHOD OF MANUFACTURING ALUMINUM ALLOY FOR FLATTENING MATERIAL AND ALUMINUM ALLOY FLATTENING MATERIAL FOR AUTOMOBILES

This application is the national phase under 35 U.S.C. §371 of PCT International Application No. PCT/JP99/01823 which has an International filing date of Apr. 6, 1999 which designated the United States of America.

TECHNICAL FIELD

The present invention relates to a method of producing an aluminum alloy for wrought material, and also to an aluminum wrought alloy obtained therefrom. More particularly, the present invention relates to a method of producing an aluminum alloy for wrought material that enables aluminum alloy casting scraps to be recycled for use, for example, not only as automotive parts, such as chassis, engines, body frames, and the like, but also as aluminum wrought alloy, such as of bicycles, motorcycles, railway vehicle structure members, building members, sporting goods, and the like.

Specifically, the present invention relates to a method of producing an aluminum alloy for automotive parts, and also to automotive parts obtained from the aluminum alloy. More specifically, the present invention relates to a method of producing an aluminum alloy for wrought material useful as automotive parts, wherein it is made possible to recycle the casting scraps of an aluminum alloy as a wrought material for automotive parts, such as space frames.

BACKGROUND ART

In recent years, effective utilization has been strongly called for, such as recycling regarding resources, in all fields. Also in regard to aluminum materials, there are no exception to this, and recycling regarding the resources has been demanded.

When aluminum alloy materials are recycled, the usual practice is to use a method wherein recycling is performed from high-quality materials with a reduced amount of impurities toward low-quality materials with a greater amount of impurities. Accordingly, whenever aluminum alloy materials are recycled, they are regenerated and reused as materials of lower quality with more impurities. Finally, such materials are utilized for casting parts or the like, containing a large amount of impurities.

When such casting parts are provided as scraps, it has been usual that part thereof is utilized as a deoxidizer for steel making, and the other is again recycled as castings or is wasted as surplus scrap, due to no demand.

The present invention has as its object the provision of a method wherein a casting scrap of an aluminum alloy is regenerated, to provide an aluminum alloy that is applicable as wrought material. The present invention also has as another object the provision of a wrought material of the aluminum alloy obtained by the method. The present invention has as a further object the provision of a method for obtaining an aluminum alloy that is recycled from an aluminum alloy casting scrap and is applicable as automotive parts. The present invention has as a still further object the provision of automotive parts obtained by the above method.

Other and further objects, features, and advantages of the invention will appear more fully from the following description.

DISCLOSURE OF THE INVENTION

In view of the above object, the inventors of the present invention, having investigated intensively, have found that the above problem can be solved by adding a scrap of an aluminum wrought alloy or a pure aluminum ingot to an aluminum alloy casting scrap, melting the resultant mixture for dilution, and, if necessary, subjecting the mixture to adjustment of elements thereof after or without purification refinement. Based on the above finding, the present inventors accomplished the present invention.

That is, according to the present invention, there are provided:

(1) A method of producing an aluminum alloy for automotive parts, which is characterized by comprising adding a pure aluminum ingot (a virgin aluminum ingot) or a scrap of an aluminum wrought alloy obtained through recovery as a scrap of a wrought material, to an aluminum alloy casting scrap, obtained via recovery of a scraped vehicle, melting the mixture, to dilute impurities, and adjusting elements in the mixture, if necessary; and (2) A method of producing an aluminum alloy for wrought material, which is characterized by comprising adding a pure aluminum ingot or a scrap of an aluminum wrought alloy obtained via recovery as a scrap of a wrought material, to an aluminum alloy casting scrap, obtained via recovery of a scraped vehicle, melting the mixture to dilute impurities, subjecting the resultant liquid metal to purification refinement according to a batch process of α-phase separating treatment, wherein the aluminum alloy liquid metal obtained after the melting and dilution is cooled and pressed to get a solid phase in the same vessel, and adjusting elements of the solid phase prior to or after the purification refinement, if necessary.

In the method as stated in the above (1) or (2), it is effective if not less than 50 wt % (hereinafter referred to simply as "%") of the aluminum alloy casting scrap is constituted of an scrap of aluminum alloy casting for automotive vehicles.

After the melting and dilution in the method as stated in the above (1), or after the purification refinement in the method as stated in the above (2), or after the adjustment of elements performed as required, it is effective if the aluminum alloy is comprising of 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

A first of automotive parts according to the invention is characterized by being composed of an aluminum alloy having a composition, which is obtained by adding a scrap of an aluminum wrought alloy or a pure aluminum ingot to an aluminum alloy casting scrap, melting the mixture to dilute impurities, and, if necessary, adjusting elements of the resultant, comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

A second of automotive parts according to the invention is characterized by being composed of an aluminum alloy having a composition, which is obtained by adding a scrap of aluminum wrought alloy or a pure aluminum ingot to an aluminum alloy casting scrap containing not less than 50% of an scrap of aluminum alloy casting for automotive vehicles, melting the mixture to dilute impurities, and, if necessary, adjusting elements therein, comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

The aluminum wrought alloy of the present invention is characterized by being composed of an aluminum alloy having a composition, which is obtained by adding a scrap of an aluminum wrought alloy or a pure aluminum ingot to an aluminum alloy casting scrap, melting the mixture to dilute impurities, subjecting the resultant aluminum alloy liquid metal obtained after the melting and dilution to purification refinement according to a batch process of $\alpha$-phase separating treatment, wherein the aluminum alloy liquid metal is cooled and pressed to get a solid phase in the same vessel, and, if necessary, adjusting elements of the solid phase prior to or after the purification refinement, comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

Another type of aluminum wrought alloy according to the present invention is characterized by being composed of an aluminum alloy having a composition, which is obtained by adding a scrap of an aluminum wrought alloy or a pure aluminum ingot to an aluminum alloy casting scrap containing not less than 50% of an scrap of aluminum alloy casting for automotive vehicles, melting the mixture to dilute impurities, subjecting the resultant aluminum alloy liquid metal obtained after the melting and dilution to purification refinement according to a batch process of $\alpha$-phase separating treatment, wherein the aluminum alloy liquid metal is cooled and pressed to get a solid phase in the same vessel, and, if necessary, adjusting elements of the solid phase prior to or after the purification refinement, comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

The aluminum wrought alloy of the present invention is particularly suitable for use as automotive parts.

It should be noted that the term "aluminum alloy casting scrap" used herein means collected, once-used casting articles, or scraps of the articles, scraps left after casting, scraps left after machining, and the like. The term "scrap of aluminum wrought alloy" means collected, once-used wrought alloy materials, scraps of the wrought alloy materials, scraps left after extrusion, scraps left after producing of sheets, scraps left after machining of wrought material, and the like.

BEST MODE FOR CARRYING OUT THE INVENTION

The present invention is now described in more detail.

The present invention relates to the manufacture of an aluminum alloy for wrought material, particularly automotive parts of an aluminum alloy, from casting scraps, by adding, to an aluminum alloy casting scrap, a scrap of an aluminum wrought alloy, such as a scrap obtained by collection of a wrought material, or a pure aluminum ingot, melting the mixture, for dilution, and, if necessary, subjecting the resultant to adjustment of elements with or without purification refinement.

In the present specification and claims, the term "automotive parts" means plate members, such as an outer plate, an inner plate, and the like, along with various types of wrought material used as parts. Usually, casting scraps contain a large amount of various types of impurities, typical of which is Si. If the scraps are applied for use as automotive parts as they are, these impurities adversely influence characteristic properties, thus making their direct use difficult.

In the practice of the present invention, an aluminum alloy material is added to the casting scrap, to dilute impurities therewith. This enables the impurities to be reduced in amount, with the possibility that the scrap can be applied for use as automotive parts.

In the above, in order to efficiently dilute the impurities with an aluminum alloy material, it is effective to use a pure aluminum ingot. In this connection, however, it is not always necessary to use a pure aluminum ingot, which is high in cost, and alloys other than a pure aluminum ingot may be used, in which alloys impurities are contained in smaller amounts than those in casting scraps.

In particular, the scraps of an aluminum wrought alloy contain impurities in amounts smaller than casting scraps and are recycled as scrap (starting material) from the aluminum wrought alloy to a wrought alloy material. From the standpoint of recycling, scraps of an aluminum wrought alloy are usable as an effective diluting material.

In the present invention, the ratio between the aluminum alloy casting scrap and the scrap of an aluminum wrought alloy or a pure aluminum ingot is not restricted. It is preferred to use 20 to 90 wt % of the aluminum alloy casting scrap and 10 to 80 wt % of the scrap of the aluminum alloy wrought or a pure aluminum ingot. More preferably, the former is used in an amount of 50 to 80 wt %, and the latter in an amount of 20 to 50 wt %. In particular, when a pure aluminum ingot alone is mixed for dilution with the aluminum alloy casting scrap, the amount of the pure aluminum ingot should preferably be 50 wt % or below.

The composition obtained after melting and dilution may be usable for automotive parts as it is, although it depends on the degree of dilution. If necessary, the alloy composition can be controlled by adjusting the elements, thus enabling applying to a wider range of automotive parts.

The adjustment of elements is intended to add some elements to given levels, or to reduce concentrations of specific types of elements, which are still contained in larger amounts than desired after the melting and dilution, and the manner of adjustment is not restricted. The adjustment can be performed according to various methods as mentioned below. In particular, specific types of elements may be added such that single elements, such as Zn, Cu, and the like, may be added to the composition, or an aluminum alloy having predetermined elements may be prepared and added as a master alloy. Moreover, in the latter case, in order that the concentrations of specific types of elements are reduced, there may be used hitherto proposed and various element-reducing methods, including a zone melting method, a vacuum distillation method, a fluxing method, a gas blowing method, a filtering method, and the like.

In the method of producing of the present invention, purification refinement may be performed in addition to the dilution of impurities. The purification refinement procedure comprises subjecting the aluminum alloy liquid metal obtained after the melting and dilution, to $\alpha$-phase separating treatment, that is, $\alpha$-solid solution separating treatment.

It is particularly preferable that the a-phase separating treatment is performed by a batch process of α-phase separating treatment, wherein cooling and pressing are effected in the same vessel, to get a solid phase, since the procedure is simple. This batch process of α-phase separating treatment is performed such that an aluminum liquid metal is cooled in a vessel to a liquidus line temperature or below, and primary aluminum crystals having a reduced amount of impurities, which crystals have been crystallized at a solidus line temperature or over, are compressed in the same vessel, to separate the resultant liquid phase, thereby getting the solid phase. In this way, the purification refinement of aluminum can be performed, and impurities, typical of which is Si, can be effectively removed.

The reason the batch process of α-phase separating treatment is adopted is based on the finding that not only can a major proportion of Si be efficiently removed from an aluminum alloy liquid metal by means of a relatively small-sized device, but also the liquid metal undergoes little contamination with other impurities during the course of the refining process.

The purification refinement process used can be a batch process of α-phase separating treatment, for example, the method described in JP-A-7-54061 ("JP-A" means unexamined published Japanese patent application) can be applicable. This treatment includes the following steps:

① melting and dilution an aluminum alloy scrap in a melting furnace;

② charging the resultant liquid metal obtained after the melting and dilution into a given vessel, where it is cooled to a temperature at which a liquid phase and a solid phase coexist;

③ compressing (pressing) the resultant by means of a stamp having multiple holes, to separate an α-phase solid solution, i.e. primary crystal phase of aluminum; and ④ getting (collecting) the α-phase solid solution from the vessel.

This batch process of α-phase separating treatment is simple and is especially effective in removing Si, and impurities whose equilibrium separation factor K is <1, such as Cu, Mg, Zn, and the like, from the aluminum alloy liquid metal. In a case of an alloy capable of forming a solid solution, when a concentration of a solute increases, the liquidus line and the solidus line lower wherein when a liquid of a homogenous composition $C_O$ reaches a liquidus line temperature $T_L$, a solid phase (solid solution) having a composition, $C_S$, crystallizes. The term "equilibrium separation factor" used herein is intended to mean a value, $C_S/C_O$, of solute concentrations of a liquid phase and a solid phase equilibrated in the above case.

In this purification refinement, other ordinary purification refinements may also be applied to the liquid metal prior to or after the batch process of α-phase separating treatment, in combination therewith. For instance, it is effective to effect an iron decreasing treatment as a preliminary step of the batch process of α-phase separating treatment.

It will be noted that the scrap used for dilution is not restricted as long as it is smaller in the amount of Si than the casting scraps used. Commercially available scraps may be used, including, for example, aluminum can scraps (UBC), aluminum sash scraps, automotive parts, or other various types of scraps obtained in processing steps, such as scraps left after producing of aluminum plate materials, or scraps left after producing of aluminum extruded products.

In automotive vehicles, a diversity of aluminum alloy parts are used, such as castings or wrought material. When an aluminum alloy, which is obtained by applying the method of the present invention to aluminum alloy casting scraps derived from automotive vehicles with or without purification refinement, is used as a wrought material, and particularly as an automotive part, circulative use of an aluminum alloy material as an automotive material, i.e. recycling of the alloy material, can be attained. Especially, when purification refinement is carried out, it brings about a great effect of reducing such impurities as set out before, e.g. Si, Cu, Mg, Zn, and the like, so that casting scraps can be conveniently utilized in larger amounts. For the same starting material, when purification refinement is carried out, a lower concentration of alloy elements can be achieved, with a lower concentration of impurities.

Furthermore, in order to achieve recycling in the practice of the present invention, it may be possible to constitute not less than 50% of a starting aluminum alloy casting scrap with an aluminum alloy casting scrap for automotive vehicle. The use of an aluminum alloy casting scrap for not less than 50% of a starting melting material is preferred, because of the remarkable effect of recycling.

Moreover, in the practice of the present invention, after melting and dilution, and, in some cases, after purification refinement, elements may be adjusted as desired, if necessary.

The aluminum alloy composition obtained after melting and dilution or purification refinement, or after the element adjustment as required, should favorably comprise 0.5 to 5.0 wt % (preferably 2.5 to 4.0 wt %) of Si, 0.2 to 5.0 wt % (preferably 0.25 to 0.5 wt %) of Mg, 0.01 to 1.2 wt % (preferably 0.1 to 0.8 wt %) of Mn, 0.1 to 1.2 wt % (preferably 0.2 to 1.0 wt %) of Zn, 0.2 to 1.2 wt % (preferably 0.3 to 0.8 wt %) of Cu, 0.2 to 2.0 wt % (preferably 0.3 to 0.8 wt %) of Fe, and one or more of 0.01 to 0.2 wt % (preferably 0.05 to 0.15 wt %) of Cr, 0.01 to 0.2 wt % (preferably 0.05 to 0.15 wt %) of Zr, 0.01 to 0.2 wt % (preferably 0.05 to 0.15 wt %) of V, and 0.01 to 0.2 wt % (preferably 0.05 to 0.15 wt %) of Ti, with the balance being made of Al and unavoidable impurities. Particularly preferably the composition comprises one or more of 0.01 to 0.2 wt % of Cr, 0.01 to 0.2 wt % of Zr, 0.01 to 0.2 wt % of V, and 0.01 to 0.2 wt % of Ti. These elements can supplement characteristics necessary as a wrought material.

Si, Mg, Mn, Zn, Cu, and Fe enhance strength of an aluminum wrought alloy, and, on the other hand, ensure necessary elongation. If the contents of these elements are too small, such effects become insufficient. On the other hand, when the contents are too large, workability, such as of rolling or extrusion, or the Charpy impact characteristic, may lower.

The element selected from Cr, Zr, V, and Ti contributes to improving bending property and toughness of the resultant alloy, owing to grain refining, thereby improving forming properties and energy absorptivity. However, if the contents of these elements are smaller, the improving effect does not become appreciable. On the contrary, when the contents are too large, coarse-grained intermetallic compounds with aluminum are formed, resulting the toughness reduced. Accordingly, the amounts of these elements are preferably within the ranges mentioned previously. The aluminum wrought alloy (particularly, extruded material) within the compositional range mentioned previously is excellent in strength, elongation, and impact energy absorptivity. For instance, when an extruded material of the present invention, which has a composition comprising 3.3 wt % of Si (hereinafter referred to simply as %), 0.3% of Mg, 0.64% of Mn, 0.54% of Zn, 0.6% of Cu, 0.63% of Fe, 0.03% of Cr, 0.03% of Zr, 0.04% of V, and 0.03% of Ti, is compared with an extruded material made of an ordinary JIS 6063 alloy, whose composition comprises 0.4% of Si, 0.4% of Mg, 0.006% of Mn, 0.007% of Zn, 0.01% of Cu, 0.12% of Fe, 0.00% of Cr, 0.00% of Zr, 0.00% of V, and 0.00% of Ti, the tensile strength, proof stress, elongation, and impact absorption energy of the former are, respectively, 320 MPa, 250 MPa, 16%, and 0.04 Nm/mm$^2$, while those of the latter are, respectively, 190 MPa, 150 MPa, 14%, and 0.02 Nm/mm$^2$. Accordingly, the alloy of the present invention is more excellent than the latter in all characteristics mentioned above.

Best results are obtained when the amounts of the elements, such as Cr, Zr, V, Ti, and the like, respectively, range from 0.05% to 0.15 wt %.

In the practice of the present invention, in order to make Si in the primary crystals finer, if necessary, for improving elongation and toughness, Sr and/or Sb may be added in predetermined ranges of amounts. In general, the effect of Na on the fineness of Si in primary crystals is known, aside from the effect of Sr or Sb. In the present invention, an aluminum wrought alloy, not an aluminum alloy casting, is directed to use, so that Na, which causes cracking of hot brittle fractures, cannot be used. Accordingly, Sr and/or Sb are used. The amount of Sr and Sb is preferably in the range of 50 to 300 ppm respectively. If the amount is too small, the effect becomes insufficient. Too large amount results in saturation of the effect.

According to the present invention, aluminum alloy casting scraps, which contain large amounts of impurities and have been difficult to recycle into other articles until now, can be converted to an aluminum alloy material that is applicable as a wrought material usable as a higher-grade material.

Moreover, according to the present invention, collected scraps of aluminum alloy castings can be utilized as a wrought material of an aluminum alloy, such as an automotive part and the like, so that wide utility is ensured, thus showing a remarkable effect on the effective use of aluminum as a resource.

EXAMPLES

Now, the present invention is described in more detail based on the following examples, which do not limit the invention.

Example 1

A casting scrap and a scrap of a wrought material or a pure aluminum ingot, mixed at mixing ratios indicated in Table 1, were melted, for dilution. In Example of this invention Nos. 1 to 9 indicated in the table, various element adjustments were performed, to provide aluminum alloys for automotive parts. Comparative Example No. 10 had a composition corresponding to JIS ADC12, and Comparative Example No. 11 referred to a material that had a composition consisting of a major proportion of ADC12 mixed with JIS AC4CH, and the like. These alloys were checked with respect to their chemical compositions after mixing and after element adjustment. The results of analysis of the chemical compositions in the thus-obtained materials are summarized in Table 1.

TABLE 1

| Sample No. | | Mixing Ratio | Stage | Chemical Composition (wt %) | | | | | | | | | | |
|---|---|---|---|---|---|---|---|---|---|---|---|---|---|---|
| | | | | Si | Fe | Cu | Mn | Mg | Zn | Cr | Zr | V | Ti | Al |
| Example of this invention | 1 | Scrap of Casting Parts: 20% Scrap of Sash: 80% | After Mixing After Element Adjustment | 3.00 | 0.62 | 0.62 | 0.05 | 0.30 —[1] | 0.36 | 0.05 | 0.00 | 0.00 | 0.01 | Balance Balance |
| | 2 | Scrap of Casting Parts: 20% Scrap of Sash: 80% | After Mixing After Element Adjustment | 3.10 3.00 | 1.05 1.00 | 0.60 0.62 | 0.07 0.05 | 0.32 1.50 | 0.34 0.32 | 0.06 0.05 | 0.00 0.00 | 0.00 0.00 | 0.01 0.01 | Balance Balance |
| | 3 | Scrap of Casting Parts: 80% Pure Al Ingot: 20% | After Mixing After Element Adjustment | 8.82 1.10 | 0.69 0.40 | 2.40 0.15 | 0.17 0.05 | 0.10 0.06 | 0.40 0.18 | 0.04 0.02 | 0.00 0.00 | 0.00 0.00 | 0.01 0.00 | Balance Balance |
| | 4 | Casting Scrap of Automotive Vehicle: 50% Pure Al Ingot: 50% | After Mixing After Element Adjustment | 4.80 4.70 | 1.12 1.10 | 1.33 1.30 | 0.13 0.12 | 0.05 0.01 | 0.51 0.05 | 0.03 0.04 | 0.00 0.00 | 0.01 0.01 | 0.01 0.01 | Balance Balance |
| | 5 | Casting Scrap of Automotive Vehicle: 60% UBC: 40% | After Mixing After Element Adjustment | 4.88 4.85 | 1.26 0.90 | 1.40 1.38 | 0.53 0.30 | 0.82 0.79 | 0.52 0.53 | 0.04 0.03 | 0.00 0.00 | 0.01 0.00 | 0.01 0.01 | Balance Balance |
| | 6 | Scrap of Casting Parts: 50% UBC: 50% | After Mixing After Element Adjustment | 5.63 2.70 | 0.63 0.65 | 1.57 0.70 | 0.51 0.52 | 0.83 0.40 | 0.27 0.20 | 0.04 0.05 | 0.00 0.03 | 0.00 0.03 | 0.01 0.03 | Balance Balance |
| | 7 | Casting Scrap of Automotive Vehicle: 60% Scrap of Sash: 40% | After Mixing After Element Adjustment | 6.10 3.40 | 1.49 1.10 | 1.60 0.78 | 0.15 0.10 | 0.20 0.50 | 0.73 0.58 | 0.05 0.06 | 0.00 0.02 | 0.01 0.02 | 0.01 0.02 | Balance Balance |
| | 8 | Scrap of Casting Parts: 40% UBC: 60% | After Mixing After Element Adjustment | 5.05 0.60 | 0.90 0.72 | 1.02 0.21 | 1.10 1.12 | 0.51 0.22 | 0.50 0.10 | 0.04 0.03 | 0.00 0.03 | 0.00 0.03 | 0.02 0.03 | Balance Balance |
| | 9 | Scrap of Casting Parts: 70% UBC: 30% | After Mixing After Element Adjustment | 6.12 0.60 | 0.40 0.33 | 1.10 0.30 | 0.06 0.10 | 0.50 1.01 | 0.70 0.20 | 0.00 0.05 | 0.00 0.05 | 0.00 0.03 | 0.03 0.05 | Balance Balance |
| Comparative Example | 10 | Scrap of Casting Parts: 100% | — | 11.00 | 0.83 | 3.00 | 0.21 | 0.12 | 0.50 | 0.05 | 0.00 | 0.00 | 0.01 | Balance |
| | 11 | Casting Scrap of Automotive vehicle: 100% | — | 9.50 | 2.10 | 2.65 | 0.25 | 1.10 | 1.00 | 0.05 | 0.00 | 0.01 | 0.01 | Balance |

(Note) [1] "—" means no element adjustment.

The thus-obtained alloys were processed into wrought material indicated in Table 2.

As for the extruded material, the alloy was cast into billets for extrusion, subjected to homogenizing treatment under conditions of 530° C.×4 hours and cooled down to room temperature, followed by heating to 450° C. and extrusion into a hollow profile of 40 mm on one side×2 mm in thickness having a section having a rectangular shape (a double hollow rectangular shape having the same rectangular figure shape inside in itself looks like Japanese Kanji letter "日", hereinafter referred to simply as "a rectangular shape").

As for the rolled material, an alloy was cast into an ingot for rolling and scalped, and it was subsequently subjected to homogenizing treatment under 530° C.×4 hours, followed by hot rolling at a rolling rate of 90% in a temperature range of 500° C. to 280° C., to provide a 4 mm-thick, thin sheet, and subsequently it was cold rolled at 50%, to obtain a 2 mm-thick, thin sheet-shaped, rolled material. Further, the extruded material and rolled material were cooled down to room temperature and subjected to aging treatment under 180° C.×2 hours. The characteristics of these materials were assessed, including the tensile characteristic, bending property, and the like.

The tensile test was carried out using a JIS No. 5 type specimen by means of the Instron-type tensile tester at a tensile rate of 10 mm/minute, to obtain the values of tensile strength, proof stress, and elongation. As for the bending test, a material to be tested was processed into a JIS No. 3 type bending test's specimen and subjected to bending tests at 180° and 90°. The bending test was evaluated for both bending at 180° and bending at 90°, as "⊚" when no cracking was observed, as "○" as good when no cracking was observed only for bending at 90°, and as "X", as poor when cracking occurred for both.

It will be noted that, as for the extruded material for both tensile and bending tests, five specimens were cut out from an outer marginal portion and a central column portion of the material, respectively, and as for the thin-rolled material, five specimens were cut out in parallel to the rolling direction, and these specimens were tested, and an average thereof was taken, to provide a measurement.

For use of these materials as a wrought material, it is preferred to attain a proof stress of not smaller than 80 N/mm$^2$, preferably 100 N/mm$^2$ or over, and an elongation value of not less than 5%, preferably 10% or over, and an absence of cracking is necessary for the bending test.

TABLE 2

| Sample No. | | Application | Tensile Strength (N/mm$^2$) | Proof Stress at 0.2% (N/mm$^2$) | Elongation (%) | Bending Property |
|---|---|---|---|---|---|---|
| Example of this invention | 1 | Extruded Material for Automotive Vehicle | 210 | 120 | 20 | ○ |
| | 2 | Extruded Material for Automotive Vehicle | 230 | 130 | 22 | ○ |
| | 3 | Extruded Material for Automotive Vehicle | 250 | 140 | 25 | ○ |
| | 4 | Extruded Material for Automotive Vehicle | 190 | 110 | 16 | ○ |
| | 5 | Sheet Material for Automotive Vehicle | 200 | 120 | 16 | ○ |
| | 6 | Sheet Material for Automotive Vehicle | 230 | 120 | 23 | ⊚ |
| | 7 | Extruded Material for Automotive Vehicle | 200 | 110 | 18 | ⊚ |
| | 8 | Sheet Material for Automotive Vehicle | 150 | 145 | 8 | ○ |
| | 9 | Extruded Material for Automotive Vehicle | 240 | 145 | 22 | ○ |
| Comparative Example | 10 | Casting | 295 | 185 | 2 | X |
| | 11 | Casting | 260 | 160 | 1 | X |

As shown in Table 2, while Example of this invention Nos. 1 to 9 exhibit tensile and bending characteristics that fully satisfy intended values for possible use as automotive parts, Comparative Example Nos. 10 and 11 are low in elongation and poor in bending property and were impossible to be used as automotive parts. Especially, if a substantial element adjustment is fully performed, it will be possible to obtain a material corresponding to AA3003 or AA6061, as will be apparent, for example, from Example of this invention No. 8 or No. 9.

Example 2

A casting scrap and a scrap of a wrought material or a pure aluminum ingot were melted, for dilution, at mixing ratios indicated in Table 3. After the steps indicated in the table, purification refinement was performed, to obtain a purified and refined alloy and a condensed alloy.

The purification refinement conditions used can be a batch process of α-phase separating treatment, as disclosed, for example, in JP-A-7-54061. More particularly, an aluminum alloy liquid metal was cooled from a liquidus line temperature, to permit an α-Al solid phase to grow, and upon arrival at an intended temperature, the solid phase (purified and refined alloy) and a liquid phase (condensed alloy) were separated from each other. In some instances, an iron-decreasing treatment, as set out, for example, in JP-A-60-234930, was performed prior to the batch process of α-phase separating treatment, so as to conduct purification refinement of Fe. With respect to the purified and refined alloy obtained after the α-phase separating treatment, element adjustment was performed as required in the respective steps of melting, dilution, and purification refinement, to provide an alloy for wrought material.

The chemical composition of an alloy was checked in the dilution and purification refinement stages, and the chemical compositions obtained in the respective stages are summarized in Table 3. Among the materials of Nos. 12 to 17 indicated in Table 3, Nos. 12 to 16 are for examples of the present invention, and No. 17 is for a comparative example dealing with a material that had the same composition as in No. 16, but that was applied not as a wrought material but as a casting material. It is to be noted that No. 16 is an example of the present invention wherein a casting scrap of an automotive vehicle and a pure aluminum ingot were mixed for dilution without performing any melting purification according to the α-phase separating treatment.

test, a material to be tested was processed into a JIS No. 3 type bending test's specimen and subjected to bending tests at 180° and 90°. The bending test was evaluated for both bending at 180° and bending at 90°, as "⊙" when no cracking was observed for bending both at 180° and 90°, as "○" as good when no cracking was observed only for bending at 90°, and as "X" as poor when cracking occurred for both.

It will be noted that, as for the extruded material for both tensile and bending tests, five specimens were cut out from an outer marginal portion and a central column portion of the material, respectively, and as for the thin-rolled material,

TABLE 3

| | | | Chemical Composition (wt %) | | | | | | | | | | |
|---|---|---|---|---|---|---|---|---|---|---|---|---|---|
| Sample No. | | Mixing Ratio | Stage | Si | Fe | Cu | Mn | Mg | Zn | Cr | Zr | V | Ti | Al |
| Example of this invention | 12 | Scrap of Casting Parts: 20% Scrap of Sash: 80% | After Dilution | 3.00 | 0.62 | 0.62 | 0.05 | 0.30 | 0.36 | 0.05 | 0.00 | 0.00 | 0.01 | Balance |
| | | | After α-phase Separating Treatment | 1.10 | 0.60 | 0.15 | 0.05 | 0.06 | 0.18 | 0.05 | 0.00 | 0.00 | 0.00 | Balance |
| | 13 | Scrap of Casting Parts: 50% Pure Al Ingot: 50% | After Dilution | 5.55 | 0.49 | 1.50 | 0.11. | 0.06 | 0.26 | 0.03 | 0.00 | 0.00 | 0.01 | Balance |
| | | | After α-phase Separating Treatment | 2.65 | 0.48 | 0.68 | 0.12 | 0.04 | 0.20 | 0.03 | 0.00 | 0.00 | 0.00 | Balance |
| | | | Addition of Additional Elements | 2.65 | 0.48 | 0.69 | 0.11 | 0.04 | 1.30 | 0.03 | 0.08 | 0.05 | 0.03 | Balance |
| | 14 | Scrap of Casting Parts: 50% UBC: 20% | After Dilution | 5.30 | 0.22 | 2.57 | 0.79 | 0.83 | 0.27 | 0.04 | 0.00 | 0.00 | 0.01 | Balance |
| | | | After Iron Decreasing Treatment | 5.20 | 0.11 | 2.45 | 0.69 | 0.80 | 0.27 | 0.02 | 0.00 | 0.00 | 0.00 | Balance |
| | | | After α-phase Separating Treatment | 2.60 | 0.10 | 1.20 | 0.68 | 0.24 | 0.13 | 0.02 | 0.00 | 0.00 | 0.00 | Balance |
| | | | Addition of Additional Elements | 2.60 | 0.10 | 1.20 | 0.68 | 0.50 | 0.13 | 0.05 | 0.00 | 0.00 | 0.00 | Balance |
| | 15 | Casting Scrap of Automotive Vehicle: 60% Scrap of Sash: 40% | After Dilution | 5.45 | 1.40 | 2.44 | 1.06 | 0.83 | 0.73 | 0.05 | 0.00 | 0.01 | 0.01 | Balance |
| | | | After Iron Decreasing Treatment | 5.36 | 0.61 | 2.67 | 0.52 | 0.80 | 0.72 | 0.05 | 0.00 | 0.01 | 0.01 | Balance |
| | | | After α-phase Separating Treatment | 2.68 | 0.60 | 1.30 | 0.53 | 0.42 | 0.58 | 0.06 | 0.00 | 0.00 | 0.00 | Balance |
| | | | Addition of Additional Elements | 2.68 | 0.60 | 1.30 | 0.53 | 0.42 | 0.58 | 0.06 | 0.02 | 0.02 | 0.03 | Balance |
| | 16 | Casting Scrap of Automotive Vehicle: 50% Pure Al Ingot: 50% | After Dilution | 6.00 | 0.70 | 1.52 | 0.11 | 0.24 | 0.41 | 0.05 | 0.00 | 0.00 | 0.01 | Balance |
| Comparative Example | 17 | Casting Scrap of Automotive Vehicle: 50% Pure Al Ingot: 50% | After Dilution | 6.00 | 0.70 | 1.52 | 0.11 | 0.24 | 0.41 | 0.05 | 0.00 | 0.00 | 0.01 | Balance |

The alloys obtained in this manner were processed into wrought material indicated in Table 4.

As for an extruded material in Table 4, an alloy was cast into billets for extrusion, subjected to homogenizing treatment under 530° C.×4 hours, cooled down to room temperature, and heated to 450° C., followed by extrusion into a hollow member, which had a size of 40 mm on one side×2 mm in thickness and a section having the rectangular shape, at the said temperature.

As for the rolled material, an alloy was cast into an ingot for rolling, scalped, subjected to homogenizing treatment under 530° C.×4 hours, and hot rolled at a rolling rate of 90% in a temperature range of 500° C. to 280° C., to provide a 4 mm-thick, thin sheet, followed by cold rolling at 50%, to obtain a 2 mm-thick, thin sheet-shaped rolled material.

The extruded material and rolled material were, respectively, cooled down to room temperature and subjected to aging treatment under 180° C.×2 hours. The characteristics of these materials were assessed, including the tensile characteristic, bending property, and the like.

The tensile test was carried out using a JIS No. 5 type specimen by means of the Instron-type tensile tester at a tensile rate of 10 mm/minute, to obtain the values of tensile strength, proof stress, and elongation. As for the bending five specimens were cut out in parallel to the rolling direction, and these specimens were tested, and an average thereof was taken, to provide a measurement.

For use of these materials as a wrought material, it is preferred to attain a proof stress of not smaller than 80 N/mm$^2$, preferably 100 N/mm$^2$ or over, and an elongation value of not less than 5%, preferably 10% or over, and an absence of cracking is necessary for the bending test.

TABLE 4

| | | | Results of Evaluation of Characteristic Properties | | |
|---|---|---|---|---|---|
| Sample No. | | Application | Tensile Strength (N/mm$^2$) | Proof Stress at 0.2% (N/mm$^2$) | Elongation (%) | Bending Property |
| Example of this invention | 12 | Extruded Material | 250 | 140 | 25 | ○ |
| | 13 | Sheet Material | 220 | 110 | 23 | ⊙ |
| | 14 | Extruded Material | 220 | 100 | 24 | ○ |

TABLE 4-continued

| Sample No. | | Application | Results of Evaluation of Characteristic Properties | | | |
|---|---|---|---|---|---|---|
| | | | Tensile Strength (N/mm$^2$) | Proof Stress at 0.2% (N/mm$^2$) | Elongation (%) | Bending Property |
| | 15 | Extruded Material for Automotive Vehicle | 230 | 120 | 23 | ◎ |
| | 16 | Extruded Material | 300 | 210 | 17 | ○ |
| Comparative Example | 17 | Casting | 160 | 120 | 2 | X |

As is apparent from Table 4, Example of this invention Nos. 12 to 15 fully satisfied intended values for use as a wrought material with respect to tensile characteristics (tensile strength, proof stress, and elongation) and bending property. The material of No. 16 of an example of the present invention, which was obtained by mixing and dilution alone without performing a liquid metal purification, and which had a high Si content, was higher in strengths, such as tensile strength, proof stress, and the like, than those of Nos. 12 to 15, although the elongation value was slightly smaller. Thus, this material had material characteristics sufficient to ensure utilization as an extruded material. In contrast, the material set forth in Comparative Example 17, which consisted of an alloy having the same composition as Example of this invention No. 16 and was obtained by mixing and dilution alone, was used not as a wrought material of the example of the present invention, but as a casting. The casting was much inferior to the wrought material of Nos. 12 to 16 with respect to strength, elongation, and bending property.

Industrial Applicability

The method of producing of the present invention is suitable as a method of providing an aluminum alloy material wherein aluminum alloy casting scraps, which contain large amounts of impurities, and which have been difficult to recycle into other products until now, can be used as a material of higher quality and can thus be applicable to wrought material, particularly to automotive parts.

As a starting material of the aluminum wrought alloy, such as automotive parts, of recovered scraps of aluminum alloy castings, can be used, so the wrought material and automotive parts of the present invention realize effective use of aluminum resources.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of producing a wrought aluminum alloy for automotive parts, comprising adding a scrap of an aluminum wrought alloy or a pure aluminum ingot to an aluminum alloy casting scrap, melting the mixture to dilute impurities, and, if necessary, adjusting elements of the resultant, wherein an alloy composition obtained after melting the mixture to dilute impurities, and, if necessary, adjusting elements of the resultant, is comprising 2.5 to 4.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

2. An automotive part composed of a wrought aluminum alloy, wherein an alloy composition obtained after adding a scrap of an aluminum wrought alloy or a pure aluminum ingot to an aluminum alloy casting scrap, melting the mixture to dilute impurities, and, if necessary, adjusting elements of the resultant, is comprising 2.5 to 4.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

3. An automotive part composed of a wrought aluminum alloy, wherein an alloy composition obtained after adding a scrap of an aluminum wrought alloy or a pure aluminum ingot to an aluminum alloy casting scrap, not less than 50 wt % of which is constituted of a scrap of an aluminum alloy casting for automotive vehicles, melting the mixture to dilute impurities, and, if necessary, adjusting elements of the resultant, is comprising 2.5 to 4.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

4. A method of producing an aluminum alloy for wrought material, comprising adding a scrap of an aluminum wrought alloy or a pure aluminum ingot to an aluminum alloy casting scrap wherein at least 50 wt % of the aluminum alloy casting scrap is constituted of a scrap of an aluminum alloy casting for automotive vehicles, melting the mixture to dilute impurities, subjecting the resultant aluminum alloy liquid metal obtained after the melting and dilution to purification refinement according to a batch process of α-phase separating treatment, wherein the aluminum alloy liquid metal is cooled and pressed to get a solid phase in the same vessel, and if necessary, adjusting elements of the resultant prior to or after the purification refinement.

5. A method of producing an aluminum alloy for wrought material, comprising adding a scrap of an aluminum wrought alloy or a pure aluminum ingot to an aluminum alloy casting scrap, melting the mixture to dilute impurities, subjecting the resultant aluminum alloy liquid metal obtained after the melting and dilution to purification refinement according to a batch process of α-phase separating treatment, wherein the aluminum alloy liquid metal is cooled and pressed to get a solid phase in the same vessel, and if necessary, adjusting elements of the resultant prior to or after the purification refinement, wherein an alloy composition obtained after the purification refinement, or, if necessary, adjusting elements of the resultant, is comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

6. An aluminum wrought alloy having a composition obtained after adding a scrap of an aluminum wrought alloy or a pure aluminum ingot to an aluminum alloy casting scrap, melting the mixture to dilute impurities, subjecting the resultant aluminum alloy liquid metal obtained after the melting and dilution to purification refinement according to a batch process of α-phase separating treatment, wherein the aluminum alloy liquid metal is cooled and pressed to get a solid phase in the same vessel, and if necessary, adjusting elements of the resultant, comprising 0.5 to 5.0 wt % of Si, 0.2 to 5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

7. A method for manufacturing automotive parts which comprises employing the aluminum wrought alloy as claimed in claim 6 for said automotive parts.

8. An aluminum wrought alloy having a composition obtained after adding a scrap of an aluminum wrought alloy or a pure aluminum ingot to an aluminum alloy casting scrap, not less than 50 wt % of which is constituted of a scrap of an aluminum alloy casting for automotive vehicles, melting the mixture to dilute impurities, subjecting the resultant aluminum alloy liquid metal obtained after the melting and dilution to purification refinement according to a batch process of α-phase separating treatment, wherein the aluminum alloy liquid metal is cooled and pressed to get a solid phase in the same vessel, and if necessary, adjusting elements of the resultant, comprising 0.5 to 5.0 wt % of Si, 0.2 to.5.0 wt % of Mg, 0.01 to 1.2 wt % of Mn, 0.1 to 1.2 wt % of Zn, 0.2 to 1.2 wt % of Cu, 0.2 to 2.0 wt % of Fe, and one or more of 0.01 to 0.2 wt % of Cr, 0.01 to 0.2 wt % of Zr, 0.01 to 0.2 wt % of V, and 0.01 to 0.2 wt % of Ti, with the balance being made of Al and unavoidable impurities.

9. A method for manufacturing automotive parts which comprises employing the aluminum wrought alloy as claimed in claim 8 for said automotive parts.

* * * * *